United States Patent
Batra et al.

(10) Patent No.: US 8,321,458 B2
(45) Date of Patent: Nov. 27, 2012

(54) RELATED CONTACT AND RECORD RECOMMENDATION FOR PRODUCT DESIGN

(75) Inventors: Anurag Batra, Union City, CA (US); Steve Chalgren, White Bear Township, MN (US); Joel Nave, Morgan Hill, CA (US)

(73) Assignee: Oracle International Corporation, Redwood Shores, CA (US)

( * ) Notice: Subject to any disclaimer, the term of this patent is extended or adjusted under 35 U.S.C. 154(b) by 531 days.

(21) Appl. No.: 12/579,467

(22) Filed: Oct. 15, 2009

(65) Prior Publication Data

US 2011/0093502 A1   Apr. 21, 2011

(51) Int. Cl.
*G06F 17/30* (2006.01)
*G06F 7/00* (2006.01)

(52) U.S. Cl. ..................................... 707/780

(58) Field of Classification Search ................... 707/780
See application file for complete search history.

(56) References Cited

U.S. PATENT DOCUMENTS

| | | | |
|---|---|---|---|
| 5,970,482 A * | 10/1999 | Pham et al. | 706/16 |
| 6,591,246 B1 | 7/2003 | Tuttle | |
| 7,016,865 B1 * | 3/2006 | Weber et al. | 705/26.5 |
| 7,386,578 B2 * | 6/2008 | Fuerst | 707/999.201 |
| 7,519,539 B1 | 4/2009 | Fliess et al. | |
| 7,519,548 B2 * | 4/2009 | Hanechak et al. | 705/26.5 |
| 2002/0049648 A1 * | 4/2002 | Inoue et al. | 705/26 |
| 2003/0078821 A1 | 4/2003 | Gorur et al. | |
| 2003/0172008 A1 * | 9/2003 | Hage et al. | 705/28 |
| 2008/0275889 A1 | 11/2008 | Hsiao et al. | |
| 2009/0006173 A1 | 1/2009 | Farrell et al. | |

* cited by examiner

*Primary Examiner* — Sathyanarayan Pannala
(74) *Attorney, Agent, or Firm* — Trellis IP Law Group, PC

(57) ABSTRACT

In one embodiment, a description of a product design is received. The description is analyzed to determine terms describing the product design. The determined terms are compared to a plurality of stored records. A subset of the stored records is determined based on the comparison. The stored records are considered relevant to the description of the product design. A set of recommended contacts associated with the subset of stored records is then determined. The recommended contacts are considered to have knowledge relevant to the description of the product design. At least one of the subset of stored records and the set of recommended contacts is output. For example, at least one of the subset of stored records and the list of recommended contacts may be displayed on an interface that is being used to input the description of the product design.

20 Claims, 8 Drawing Sheets

404
Current Entry
Text
   Need a nuclear
      submarine with
   defrost propeller
Attributes
   Customer - DOD
   Contract Type- government Stored Records
1. Text
   Need a submarine with
      propeller
   Attributes
      Customer – Submarine Co.
      Contract type - Commercial score: 10 + 1 = 11

402

| Text | Weight | Terms Attributes | Weight |
|---|---|---|---|
| Propeller | 1 | Customer | 5 |
| Submarine | 10 | Contract type | 5 |
| Aircraft | 5 | | |
| Nuclear | 15 | | |

2. Text
   Need a nuclear aircraft
      with propeller
   Attributes
      Customer – DOD
      Contract type – government score: 15 + 1 + 5 + 5 = 26

RELATED CONTACT AND RECORD RECOMMENDATION FOR PRODUCT DESIGN

BACKGROUND

Particular embodiments generally relate to enterprise management data processing.

Large companies often have resident expertise in certain subject matter from projects performed in the past. However, the size of the company makes it hard for other people to know who has worked on related projects. Thus, a user working on a new project may not know that another user has worked on a related project and may be an expert in the subject matter. Trying to search for users who may be potential subject matter experts may be a long and frustrating process. A user needs to know what skills they are looking for and often search systems do not provide accurate or focused results. This acts as a deterrent for most users to even try to search for subject matter experts.

SUMMARY

Particular embodiments generally relate to determining stored records and/or recommended contacts for a product design. In one embodiment, a description of a product design is received. For example, a user may be inputting a requirement of a customer need for a product. The description is analyzed to determine terms describing the product design. The determined terms are compared to a plurality of stored records. A subset of the stored records is determined based on the comparison. The stored records are considered relevant to the description of the product design. A set of recommended contacts associated with the subset of stored records is then determined. The recommended contacts are considered to have knowledge relevant to the description of the product design. At least one of the subset of stored records and the set of recommended contacts is output. For example, at least one of the subset of stored records and the list of recommended contacts may be displayed on an interface that is being used to input the description of the product design if one or more predetermined criteria are met.

In one embodiment, a method is provided that comprises: receiving a description for a product design; analyzing the description to determine one or more terms describing the product design; comparing the determined one or more terms to a plurality of stored records; determining a subset of stored records based on the comparison, the subset of stored records considered relevant to the description of the product design; determining a list of recommended contacts associated with the subset of stored records, the list of recommended contacts considered to have potential knowledge relevant to the description of the product design; and outputting at least one of the subset of stored records and the list of recommended contacts.

In another embodiment, a computer-readable storage medium comprising encoded logic for execution by the one or more computer processors is provided. The logic when executed is executable to: receive a description for a product design; analyze the description to determine one or more terms describing the product design; compare the determined one or more terms to a plurality of stored records; determine, by the one or more computer processors, a subset of stored records based on the comparison, the subset of stored records considered relevant to the description of the product design; determine, by the one or more computer processors, a list of recommended contacts associated with the subset of stored records, the list of recommended contacts considered to have potential knowledge relevant to the description of the product design; and output at least one of the subset of stored records and the list of recommended contacts.

An apparatus is provided that comprises: one or more computer processors; and logic encoded in one or more computer readable storage media for execution by the one or more computer processors. The logic when executed is executable operable to: receive a description for a product design; analyze the description to determine one or more terms describing the product design; compare the determined one or more terms to a plurality of stored records; determine, by the one or more computer processors, a subset of stored records based on the comparison, the subset of stored records considered relevant to the description of the product design; determine, by the one or more computer processors, a list of recommended contacts associated with the subset of stored records, the list of recommended contacts considered to have potential knowledge relevant to the description of the product design; and output at least one of the subset of stored records and the list of recommended contacts.

A further understanding of the nature and the advantages of particular embodiments disclosed herein may be realized by reference of the remaining portions of the specification and the attached drawings.

BRIEF DESCRIPTION OF THE DRAWINGS

FIG. 4 shows an example of calculating a score according to one embodiment.

FIG. 9 depicts an example of an interface according to one embodiment.

DETAILED DESCRIPTION OF EMBODIMENTS

Figure 1:
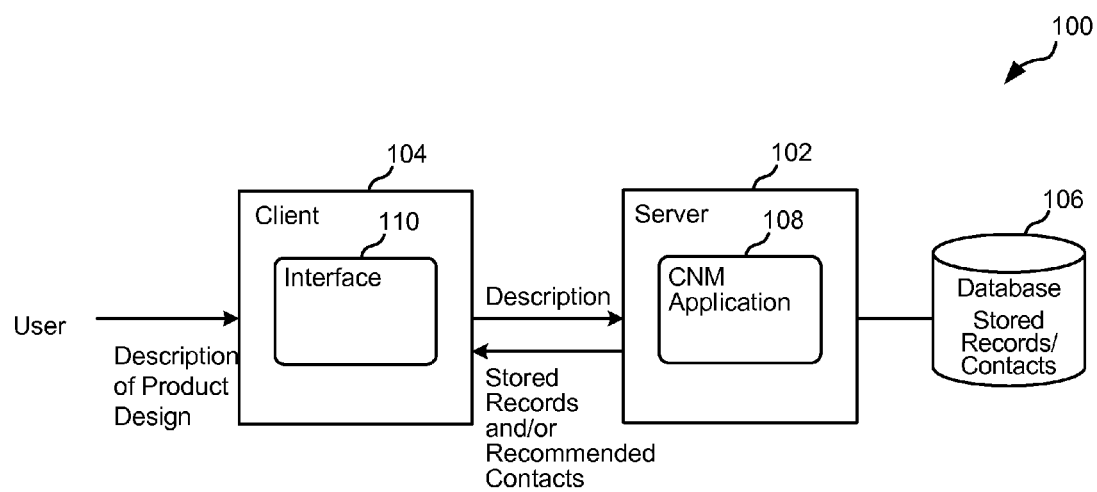
FIG. 1 depicts a simplified system for providing recommended contacts according to one embodiment.

FIG. 1 depicts a simplified system 100 for providing stored records and/or recommended contacts according to one embodiment. System 100 includes a server 102, a client 104, and a database 106. Although a single instance of server 102, client 104, and database 106 are shown, it will be understood that multiple instances may be provided. For example, multiple clients 104 may be interacting with server 102 and data may be stored in multiple databases 106. Also, it will be understood that functions described with respect to specific devices may be distributed among different devices.

Server 102 includes a customer needs management (CNM) application 108. CNM application 108 may be used to facilitate inputting of entries with descriptions for different product designs. The description may be information for a customer requirement for the product design. A requirement is information received from the customer that needs to be logged for the product design. For example, a requirement may be a customer need, such as a new feature that a customer desires for the product or any other information received from the customer for the product. The requirement may be an entry that includes notes and other information about the product design. A product design may pertain to any service or good that is offered by the company. Examples include, but are not limited to, software applications, physical products, and consulting services.

A user may input the description in an entry using interface 110. CNM application 108 may manage the entries that are logged by various users for various product designs. These requirements are logged and stored in database 106. The requirements are stored such that other users, such as engineers, may access the requirements and use them in design of the product. For example, a customer need may be logged and it may be addressed by an engineer.

CNM application 108 is configured to provide a user with a set of stored records and recommended contacts based on the description of the product design. The stored records and recommended contacts are considered to be relevant to the description being entered by a user. For example, stored records may be related to the subject matter of the description being entered for the product design. Providing the stored records and recommended contacts may expose the user to additional resources that may be helpful and that leverage the subject matter expertise of a company.

Database 106 may include any number of storage devices that can store the created records. CNM application 108 may search the stored records to find records that may be relevant to a description of the product design being entered by the user. For example, as a user is inputting the description of the requirement, certain terms from the description may be determined. These terms are used to search the stored records to determine a subset of the records. In one embodiment, the searching may be done in the background. Performing the search in the background may mean that the search is automatically performed as the user is inputting the description or otherwise interacting with an open entry. For example, as a user is typing in the information, a search may be performed without a specific input or command by the user to perform the search. That is, the user does not indicate a search should be performed for the stored records. In other embodiments, the search may also be triggered based on certain events. Certain trigger points may be used to initiate a search, such as when a user saves the record, selects another input, or indicates a search should be performed.

By performing this search in the background, the user does not have to affirmatively perform a search. Also, by determining terms from the description the user is entering, the user does not need to determine the search terms that are used. Rather, by inputting the entry into CNM application 108, CNM application 108 determines which terms may be relevant to the product design. Thus, the user does not need to determine or input a query. However, in one embodiment, the user may provide terms that may be used in the search. The provided terms may be supplemented with terms automatically determined from the input.

The user may interact with application 108 to input the entry as he/she normally would when a requirement needs to be entered. However, the stored records and recommended contacts are output to expose the user to potential related subject matter and people with subject matter expertise. For example, similar requirements may have been entered by other users. These records are provided to the user and may be used by the user in real-time to address the current requirement. Also, by providing a list of contacts that may have the potential expertise in the subject matter, the user may instantly contact these users for information. The user can thus easily find related subject matter and corresponding contacts automatically.

Figure 2:
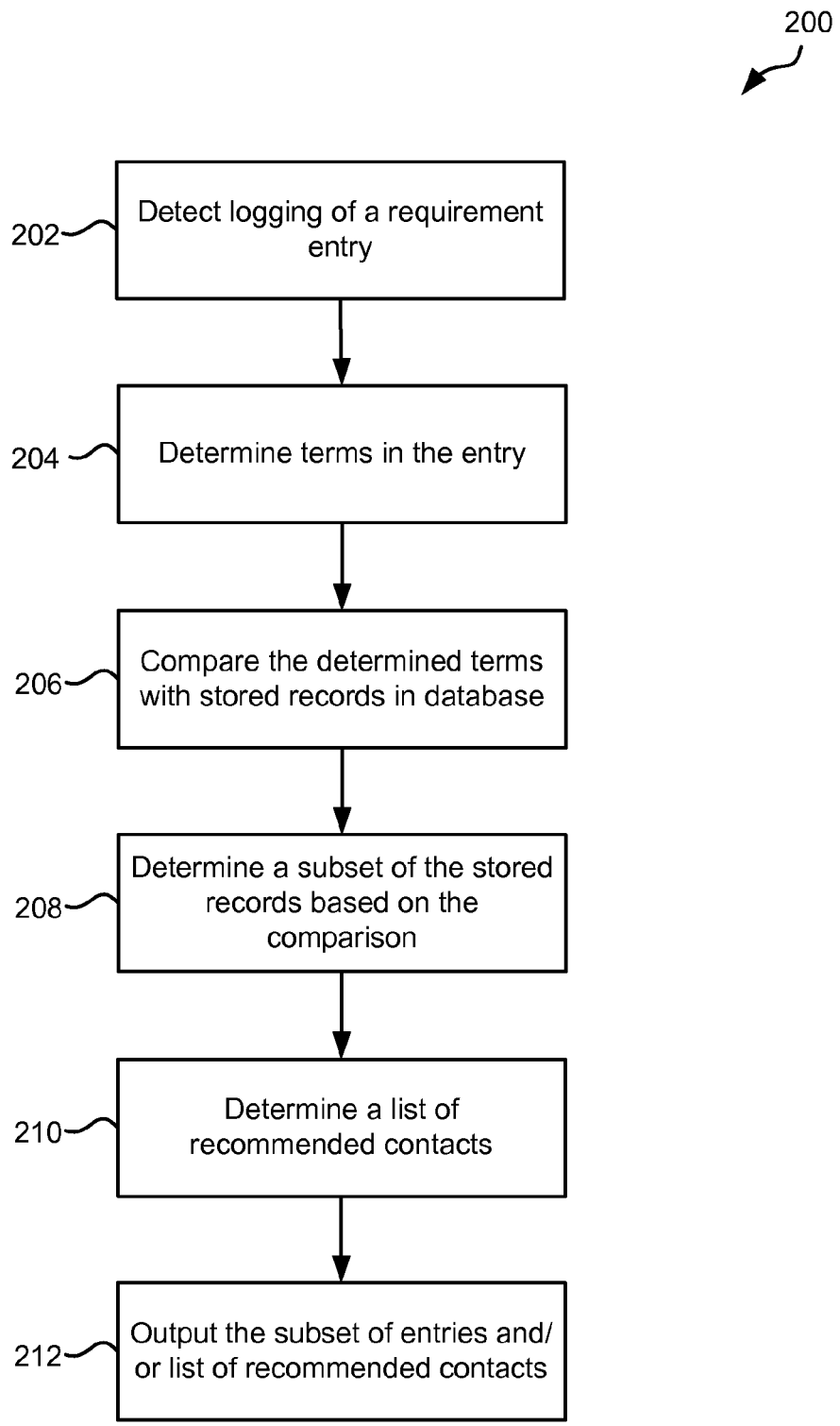
FIG. 2 depicts a simplified flowchart of a method for determining a subset of stored records and/or a list of recommended contacts according to one embodiment.

FIG. 2 depicts a simplified flowchart 200 of a method for determining a subset of stored records and/or a list of recommended contacts according to one embodiment. In step 202, CNM application 108 detects inputting of a description of a product design. For example, a user may be typing in a description for a requirement in interface 110.

In step 204, CNM application 108 determines terms in the entry. For example, the entered text for the requirement is analyzed to determine keywords from the text. The keywords may be extracted from the text. In one embodiment, the text may be matched against a pre-determined set of keywords to determine the ones that match. For example, a customized set of keywords or a pre-defined set of keywords is defined. If words in the inputted text match one of these keywords, a match is determined. Also, the terms may be derived from the text. For example, similar words, such as synonyms and related words, to words in the text may be determined. Additionally, attributes or metadata may be analyzed to determine terms. An attribute may be information that may be a well-defined set of values. For example, the attribute may be selected from fields (e.g., a drop-down menu) in which pre-determined or fixed values may be provided. In one example, a customer or contract type may only include certain numbers of types that can be selected. The difference between an attribute and the text is that a user may input any text but is limited in what can be input for an attribute. When a term is used, it will be understood that the term includes either the text or the attribute.

The terms that are determined are considered relevant to the description of the product design. By automatically determining terms, this alleviates a requirement of the user to determine a search query. For example, the user does not have to know what subject matter they are looking for and just has to enter in the requirement entry as they normally would.

In step 206, CNM application 108 compares the determined terms with stored records in database 106. For example, the stored records may also be associated with a set of stored terms. In one embodiment, the stored terms may be tags, which are descriptive words that are associated with a stored record. The determined terms are compared with the stored terms of the stored records to rank the stored records. A ranking methodology will be described in more detail below. Although a comparison of terms to stored terms is described, it will be understood that other comparisons may be used, such as the determined terms are compared to text of the stored records.

In step 208, CNM application 108 determines a subset of the stored records based on the comparison. For example, a certain number of the stored entries may be determined. In one example, the top ten ranked stored records may be determined. Also, the number of stored records may be determined based on a percentage degree of match of terms (e.g., 75%) in an entry. For example, all stored entries that match 75% of the determined terms are determined. In one example, one or more preconfigured criteria may be used to determine if stored records qualify as being related. For example, if a 75% match is not achieved by any entries, then no stored records may be returned. This is because there might be a low probability the stored records are related to the current entry and any stored records would not be helpful.

In step 210, CNM application 108 determines a list of recommended contacts. The list of recommended contacts may be users that are associated with the subset of records and not from records outside of the stored records determined in step 208. However, other embodiments may determine users from entries not found in the subset, such as a limited number of records outside of the subset may also be used. In one embodiment, a list of a number of most frequently encountered contacts that are associated with the subset of stored records may be determined. For example, each record may have a number of users that are associated with it, such as a user may be a creator, may have performed an action with the stored entry, may have left a comment, or performed any other action with the record. The users may be ranked and a list of the highest ranked (e.g., top 5) users may be determined as the list of contacts. These users are considered to have potential knowledge that is relevant to the description of the product design. For example, if the user has created a requirement or worked on the product that is in the subset of records, the user may have knowledge that is relevant to the description being inputted. Thus, the user may want to initiate contact to one of the recommended contacts.

In step 212, CNM application 108 may output the subset of stored records and/or list of recommended contacts. In one embodiment, the subset of entries and list of recommended contacts may be displayed on interface 110 in the screen in which the user is entering the requirement entry.

Figure 3:
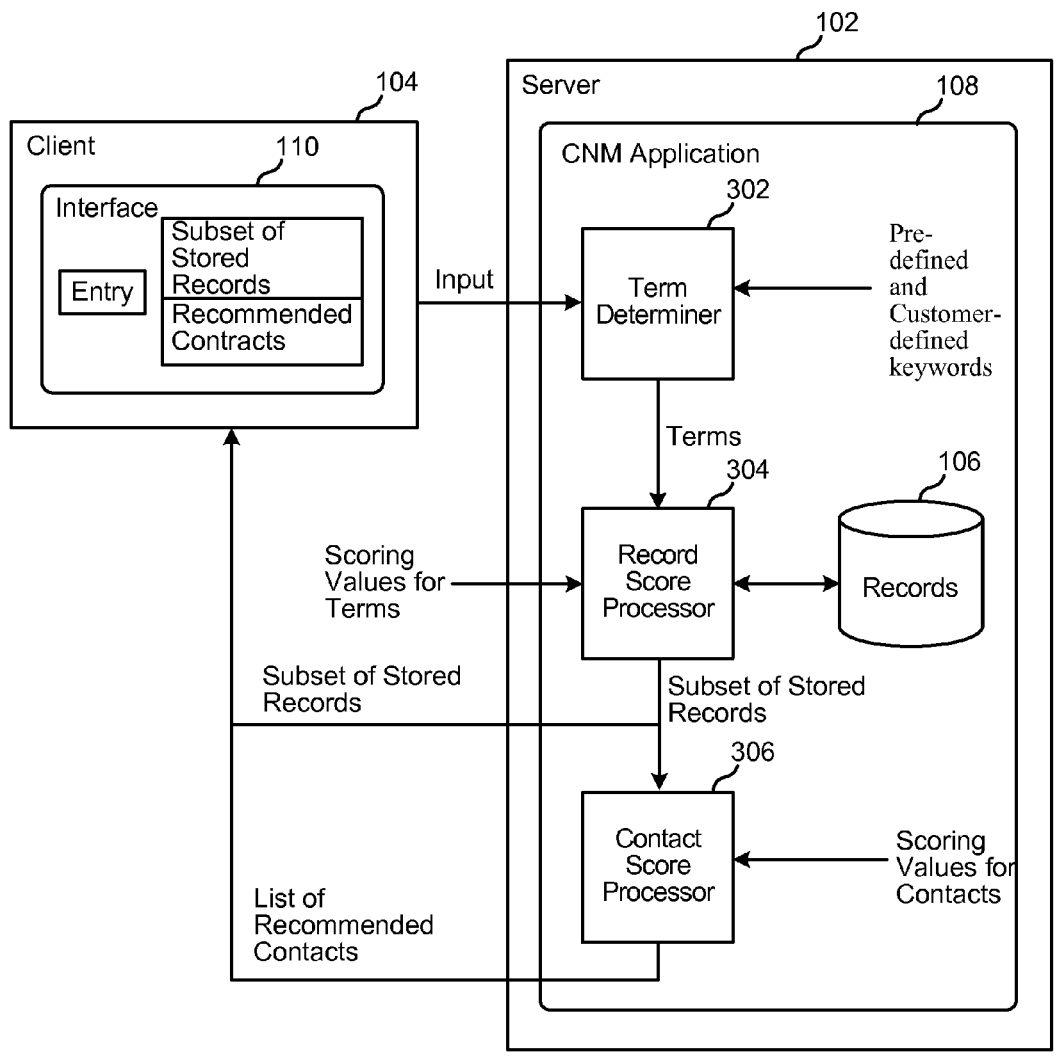
FIG. 3 shows a dataflow for determining a subset of records and a list of recommended contacts according to one embodiment.

FIG. 3 shows a dataflow for determining a subset of records and a list of recommended contacts according to one embodiment. A term determiner 302 receives input from client 104. The input may be a description of the product design in a requirement entry. Term determiner 302 then analyzes the input to determine terms. The input may include text entered by a user and also attributes and metadata. Term determiner 302 receives pre-defined and customer-defined keywords. These keywords are used to determine the terms from the input. For example, terms in the input that match the predefined or customer-defined keywords are determined as the set of terms.

A record score processor 304 uses the terms to determine a subset of records from database 106. Scoring values, such as weights, for the keywords are used to determine the score for each of the stored records. A subset of the highest scoring records is determined.

Record score processor 304 may be provided with a configuration that is used to calculate the scores. For example, weights for certain terms are configured. In one embodiment, different weights and terms may be used by different customers because different customers may value terms differently. For example, if a company's main business is manufacturing propellers, then it may be expected that "propeller" may be found in most requirement entries. However, the company may mainly manufacture aircraft propellers but not many submarine propellers. The term submarine may not be used very much in stored records and also the product designs may be handled by a small group of designers. Thus, a weight for the term "submarine" may be higher than "propeller" or "aircraft" because if an entry includes "submarine", then there is a higher chance that it may be related to other entries that include "submarine" as opposed to "propeller" or "aircraft". However, a second company may mainly manufacturer submarine propellers and not aircraft propellers. In this case, the second company may weight the term "aircraft" higher. Accordingly, a company may customize the scoring weights for terms based on their business, which may provide better search results. In addition to the customization, a standard set of weights for terms may be used. For example, weights are set for different terms without regard to a customer's business. The standard and customized weights are combined and used by record score processor 304.

The weights are then used to determine a score. In one example, the number of terms matched and the weights are used to calculate a score for a record. FIG. 4 shows an example of calculating a score according to one embodiment. It will be recognized there are other ways to rank stored records and calculate a score. In another embodiment, the score may be higher for a term that is matched multiple times.

Weights for the terms are shown in a box 402. Other weights may also be appreciated.

A current entry that is being input is shown at 404. This includes the text of "Need a nuclear submarine with a defrost propeller." The attributes include the customer type of Department of Defense (DOD) and a contract type of government. The terms for use in a search of nuclear, submarine, and propeller are determined from the text and are shown as underlined. Also, the terms of DOD and government are determined from the attributes. These terms are then used to determine scores for the stored entries.

For a stored record #1, the terms submarine and propeller are matched in text for the stored record. These terms are weighted with 10 points and 1 point, respectively. Also, the customer type and contract type do not match the terms in the current entry. The total number of points is thus 11.

For a stored record #2, the terms nuclear and propeller are matched. This yields scores of 15+1. The term aircraft is a term that is weighted but the term is not included in current entry 404 and thus does not factor into the score. Also, the contract type is government and customer is DOD, which yields 5+5 points. In this case, the total is 26 points. Accordingly, stored record #2 is ranked higher than stored record #1. In the scoring methodology, the company may have a large amount of designs with propellers, and this term is weighted lower. The company may also manufacture more submarines than aircrafts, and submarine is weighted higher. However, a design of a nuclear aircraft or submarine or any other nuclear product may be highly specialized. Accordingly, this term is weighted higher than the other terms. The higher weighting may be used because if a stored record includes nuclear and matches a current entry, the stored record may be more likely that it is relevant to the current entry. For example, the knowledge for a stored record for the nuclear subject matter may be highly relevant to the current entry.

Although this scoring methodology is described, it will be understood that other methodologies may be used, such as a percentage match of the terms. For example, the percentage match of terms for the current entry and terms found in the stored record may be determined and used to generate the score. A second score of the percentage of terms that did not match may also be determined. These scores are sorted with the percentage matched followed by the percentage not matched.

Referring back to FIG. 3, the subset of stored records may be sent to a contact score processor 306. Contact score processor 306 analyzes users associated with the subset of stored records and determines scores for the users. The users may be ranked according to the score and a list of recommended contacts is determined, such as a list of the highest-ranking users. An example of a scoring process for the list of users will be described in more detail below.

The subset of stored records and list of recommended contacts are then sent to client 104, which may automatically display them in interface 110.

Figure 5:
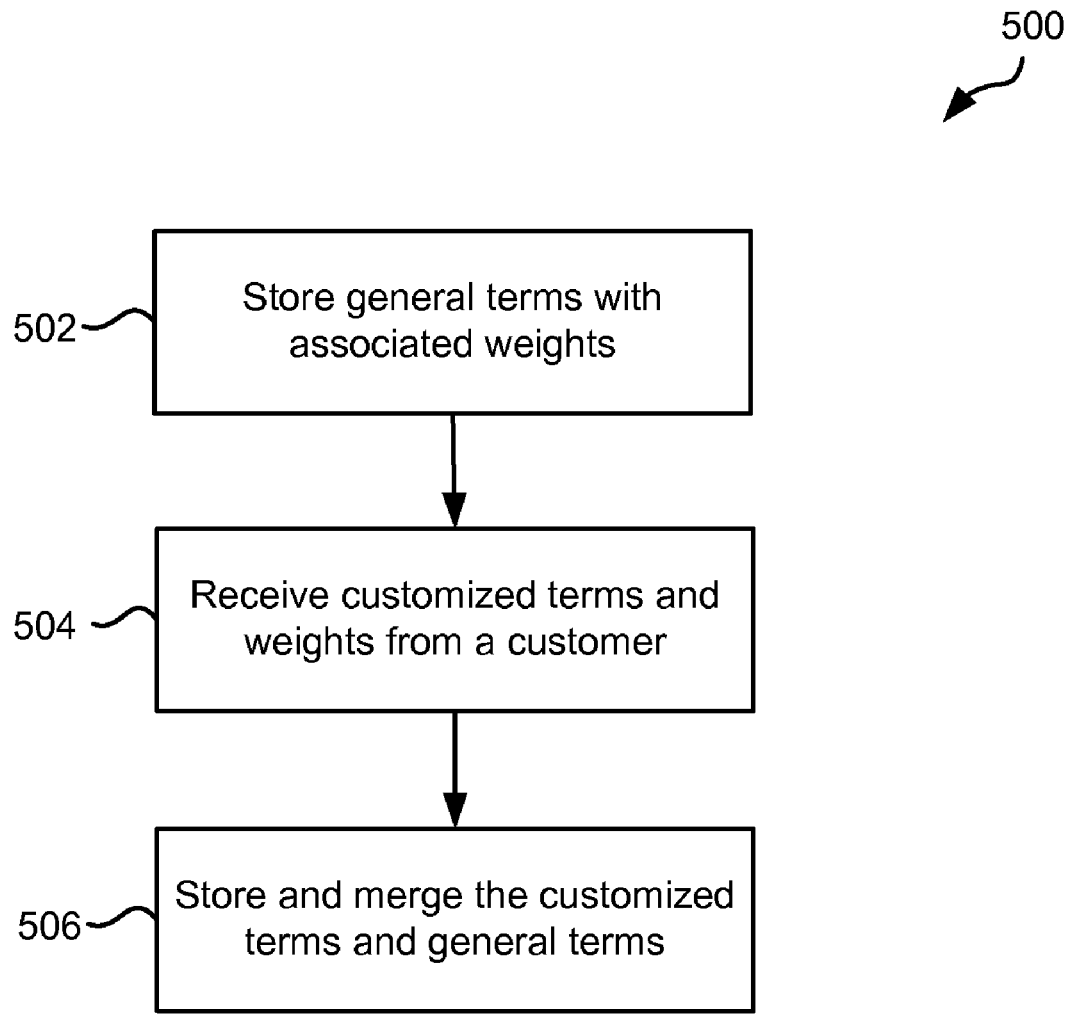
FIG. 5 depicts a simplified flowchart of a method for configuring a scoring methodology according to one embodiment.

The overall process will now be described in more detail. The configuration of the scoring for terms will now be described. FIG. 5 depicts a simplified flowchart 500 of a method for configuring a scoring methodology according to one embodiment. Step 502 stores general terms with associated weights. For example, CNM application 108 may include pre-defined or standard terms that have weights associated with them. These terms may not be customized for a customer. For example, the terms may be weighted the same for different customers. In one example, the term nuclear may have the same weight in the general terms.

Step 504 receives customized terms and weights from a company with weights. The company may determine different weights for certain terms. For example, a user may specify terms that are considered important. The weights may also be automatically assigned. For example, the user may not have to determine an exact weight but may just rank the terms as highly relevant, relevant, or not relevant. Then, CNM application 108 may assign the appropriate weights.

Step 506 stores and merges the customized terms and general terms. In one embodiment, the weights for the customized terms may replace the weights for the general terms, if applicable. For example, the weight for nuclear may be replaced with a different weight.

Figure 6:
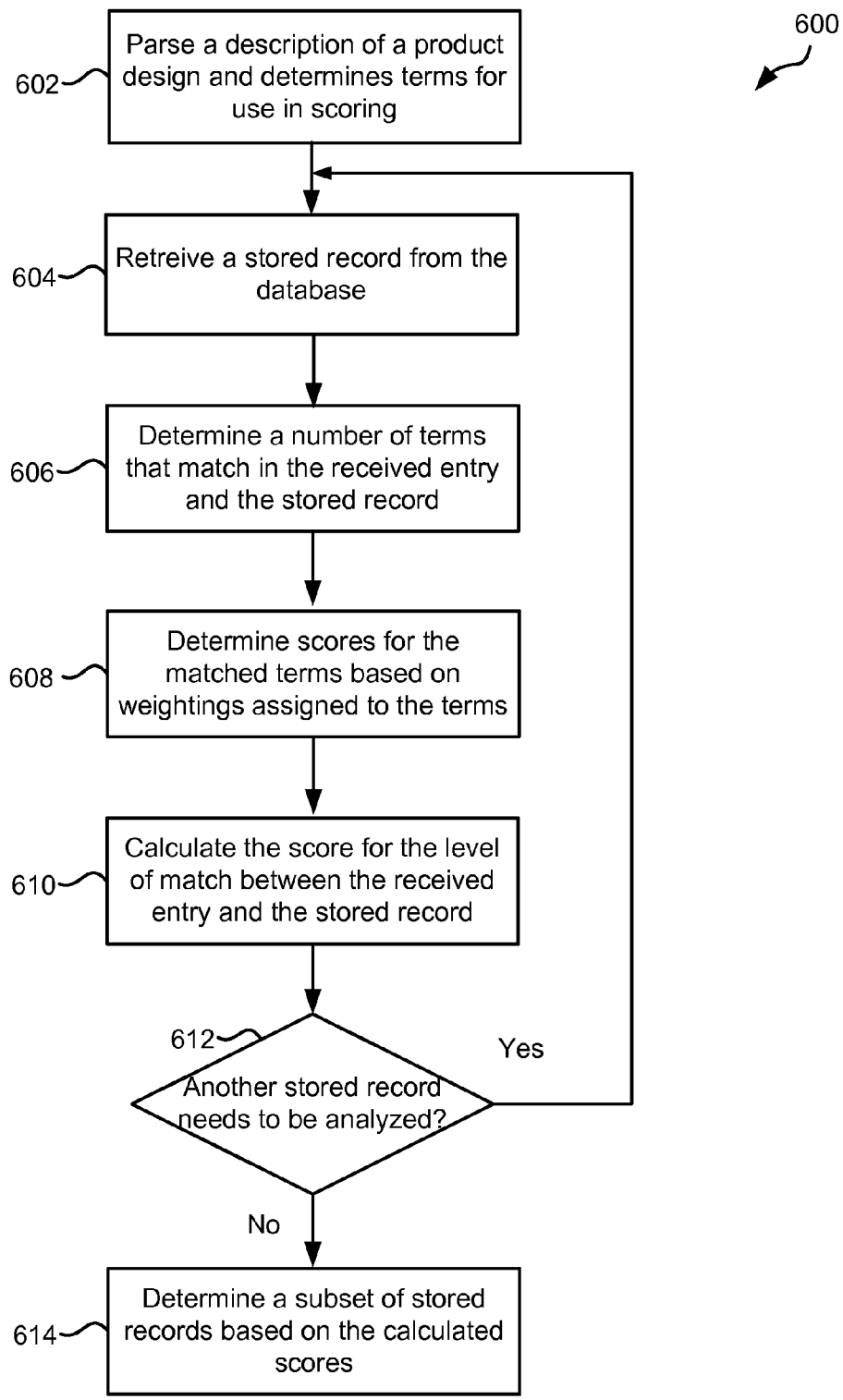
FIG. 6 depicts a simplified flowchart of a method for determining scores for stored records according to one embodiment.

Once the weights are determined, the scoring process can be performed. FIG. 6 depicts a simplified flowchart 600 of a method for determining scores for stored records according to one embodiment. In one embodiment, record score processor 304 may perform the method.

Step 602 parses a description of a product design and determines terms for use in scoring. Step 604 retrieve a stored record from database 106. Although the process is being described as processing a single stored record at a time, it will be understood that multiple records may be processed simultaneously.

Step 606 determines a number of terms that match in the received entry and the stored record. Step 608 determines scores for the matched terms based on weightings assigned to the terms.

Step 610 calculates the score for the level of match between the received entry and the stored record. All the values assigned to the terms may be summed in one embodiment. It will be understood that other methods may be provided to determine a score.

Step 612 determines if another stored record needs to be analyzed. If so, the process reiterates to step 604 where another record is determined and a score is calculated.

If another stored record does not need to be processed, then step 614 determines a subset of stored records based on the calculated scores. For example, the top N number of records may be selected.

Figure 7:
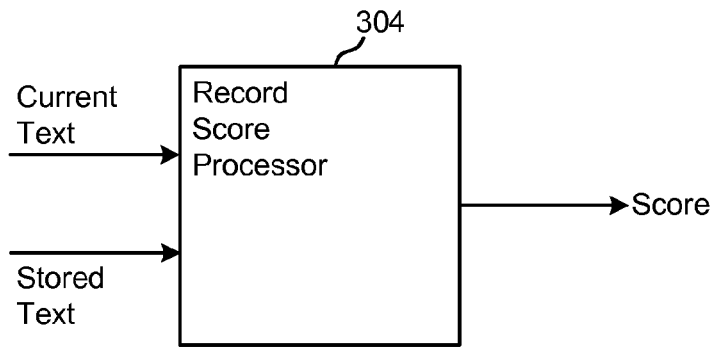
FIG. 7 shows an example of a matching score determiner according to one embodiment.

In one embodiment, record score processor 304 may use a template to determine a score. FIG. 7 shows an example of record score processor 304 according to one embodiment. Record score processor 304 receives text for the current entry and text for a stored entry. The text is analyzed using the template to determine a score. Record score processor 304 then outputs a score. Thus, text may be input for both the current entry and the stored entry. The full text may be analyzed to determine terms and a score is determined.

Figure 8:
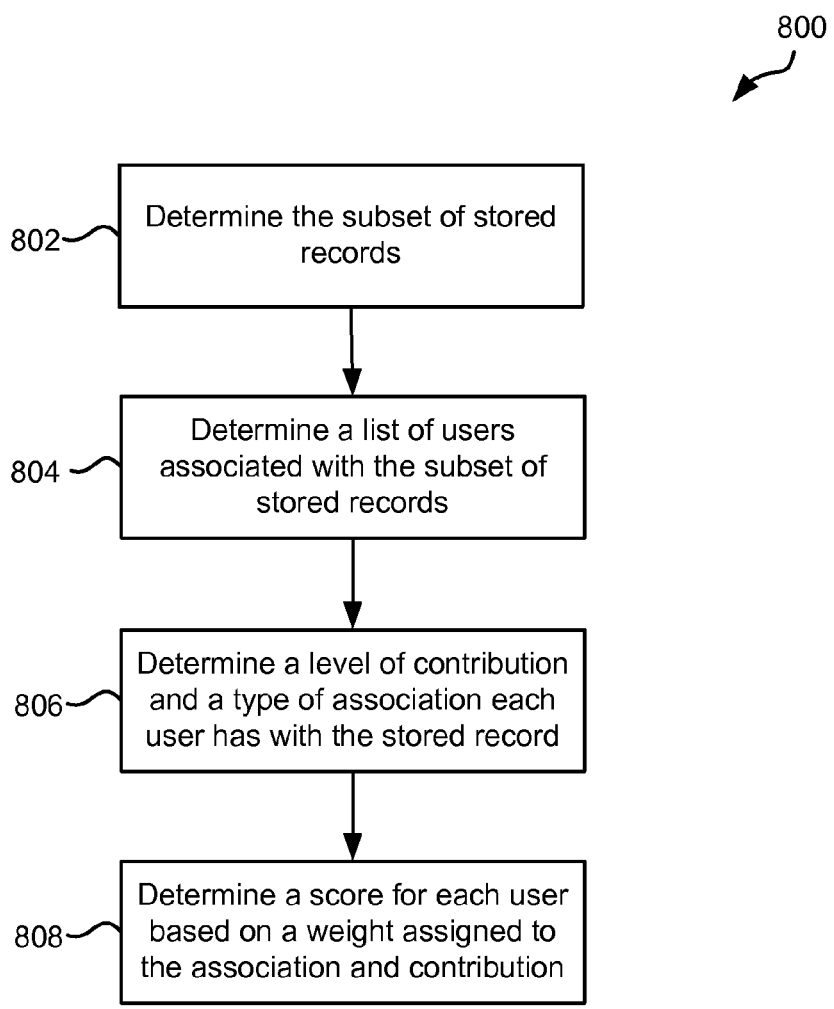
FIG. 8 depicts a simplified flowchart of a method for determining a list of contacts according to one embodiment.

Once the subset of stored records is determined, a list of recommended contacts can be provided. FIG. 8 depicts a simplified flowchart 800 of a method for determining a list of recommended contacts according to one embodiment. In one embodiment, the process may be performed by contact score processor 306.

Step 802 determines the subset of stored records. For example, the subset of stored records may be received from record score processor 304.

Step 804 determines a list of users associated with the subset of stored records. For example, multiple users may be associated with a stored record for different reasons. In one example, users may have created the record, commented on the record, been a team member that worked on a project for the record, or may be associated with the record in other ways. CNM application 108 may determine the list in different ways. For example, metadata may list users associated with the record. In another example, contact score processor 306 may parse the text of the record to determine the users.

Step 806 determines a level of contribution and a type of association each user has with the stored record. For example, the type of association may be determined based on metadata. The associated may include a user may be listed as a creator of the document, listed in the document history, or left a comment. The level of contribution from the type of association is used to determine the score for each user.

Step 808 determines a score for each user based on a weight assigned to the association. For example, a weight of 10 may be assigned for a creator of the record, a weight of 1 for a comment, and a weight of 5 for a team member. Other weights may also be appreciated. The weights may be determined based on how much knowledge an association may generally indicate. For example, a creator of a record may be considered to have the most knowledge. A team member that worked on the project may also have a good amount of knowledge and is weighted a little below a creator. A user who commented on a record may or may not have knowledge and is weighted lower.

Depending on the number of associations for a user, the scored is calculated, such as by summing the scores. For example, the total score for a user is determined based on all of the stored records in the subset. For example, if a user was a creator of multiple records, a score of 10 may be added for each stored record that he/she was a creator.

Once a total score for the users is determined, the list of recommended contacts is determined based on the scores. For example, a list of a certain number of users, such as 10, is determined as the list of recommended contacts.

The scores calculated in FIG. 8 may be recalculated at various intervals. For example, the scores may potentially change every time a stored record is changed, such as a comment is added. When a record is modified, contact score processor 306 may recalculate the scores and determine a new list of recommended contacts. This list of users may also change as the user inputs more text for the current entry. Thus, the list of recommended contacts may be dynamically changing.

Figure 9:
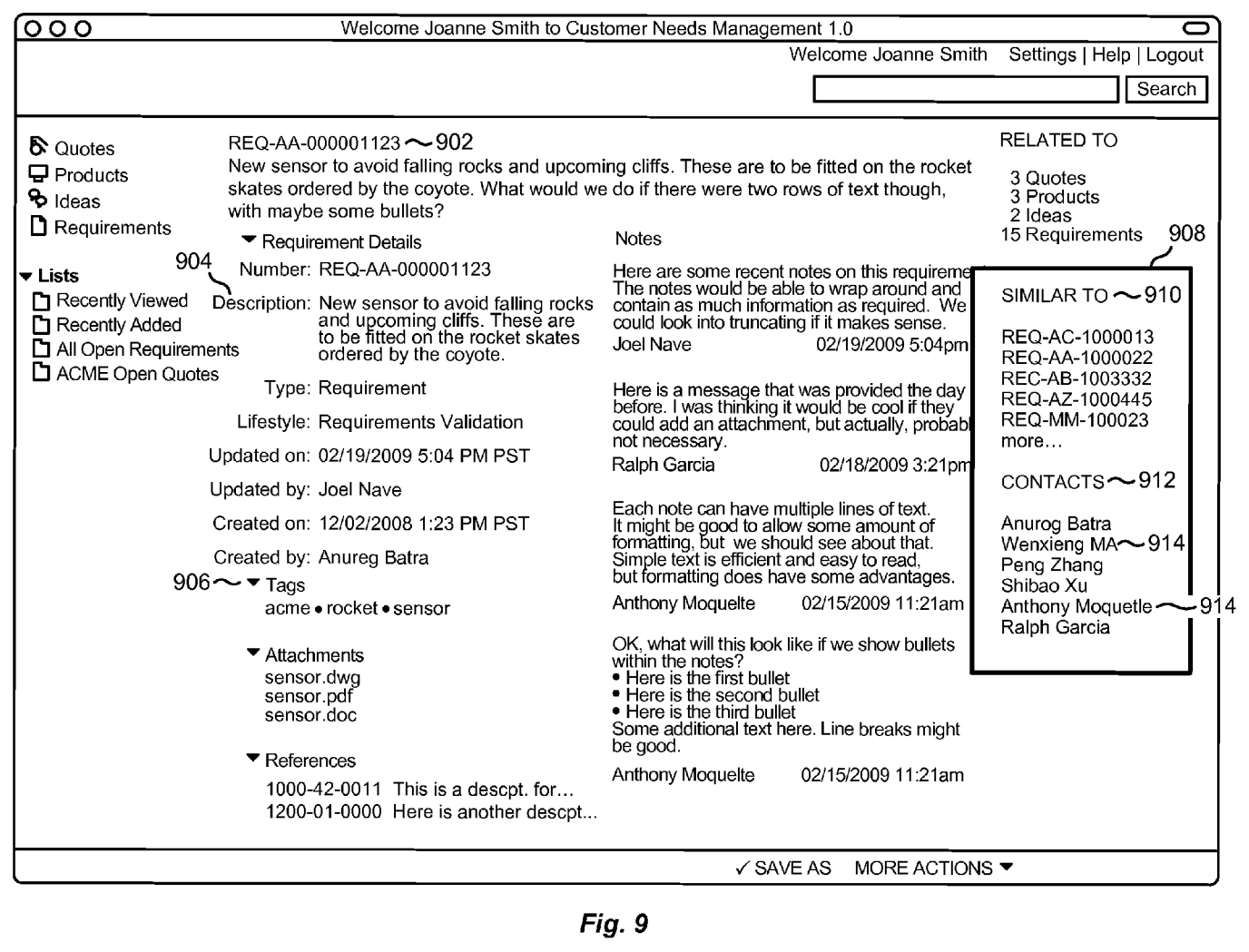

The interface used by a user also can display the determined subset of records and list of recommended contacts. FIG. 9 depicts an example of an interface 110 according to one embodiment. A requirement 902 has been entered or is in the process of being entered by a user. The requirement includes text, such as a description 904 that states the requirement is a "New sensor to avoid falling rocks and upcoming cliffs. These are to be fitted on rocket skates ordered by the coyote." Certain terms have been determined at 906. These terms are entered by a user and can be used in the search. Various other text is provided for the requirement.

A display 908 shows a subset of stored records 910 and a list of recommended contacts 912. The stored records are considered to be relevant to the requirement being inputted by the user. The user can review the displayed records and determine if they are relevant. If so, the user may select a record and be shown more information for the record.

Also, the recommended contacts are considered to have potential knowledge about the subject matter of the requirement. The user may decide to contact one of the users for more information. In one embodiment, interface 110 facilitates a communication to the recommended contacts. For example, presence information 914 may be provided for certain contacts. The presence information shows that a user may be contacted (i.e., is online on an instant messaging system, such as a corporate instant messaging system). CNM application 108 determines contact information for the contacts and allows a user to automatically initiate a communication to one of the contacts. For example, a user may select one of the contacts and initiate the communication, such as an instant message or phone call, to the contact. This provides a user with easy access to the contact. For example, a user may easily get in touch with a contact and ask them questions about their potential knowledge on the product design. In addition to presence information 914, the contact may be selected and be provided with contact information or other general information about the contact (e.g., position, manager, work group, etc.).

Accordingly, a user is automatically exposed in real-time to recommended contacts that may be potential subject matter experts for a requirement being entered by the user. This provides re-use of knowledge that exists in an organization. Also, particular embodiments provide ease of use in that the user does not have to manually search for the recommended contacts or related records. Rather, the information being entered may be analyzed and used to determine the related records and recommended contacts.

Although the description has been described with respect to particular embodiments thereof, these particular embodiments are merely illustrative, and not restrictive. Although requirement entries for a customer need are described, it will be understood that any entries may be analyzed to provide potential subject matter expertise to a user.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method, performed by one or more computer processors, comprising:
    receiving a description for a product design;
    analyzing the description to determine one or more terms describing the product design;
    comparing the determined one or more terms to a plurality of stored records;
    selecting a subset of stored records based on the comparison, the subset of stored records considered relevant to the description of the product design;
    assigning weights to terms included in each record of the subset of stored records based on relevancy criteria;
    calculating a score for each record in the subset of stored records utilizing the weights assigned to the terms in each record;
    selecting a preferred subset of stored records based on scores assigned to each record in the subset of stored records;
    analyzing each record in the preferred subset of stored records to identify persons associated with each record;
    applying relevancy criteria to identified persons to determine a list of recommended contacts associated with the preferred subset of stored records, the list of recommended contacts considered to have potential knowledge relevant to the description of the product design; and
    outputting at least one of the records in the preferred subset of stored records and the list of recommended contacts.

2. The method of claim 1 where applying relevancy criteria to identified persons further comprises:
    assigning weights, using the one or more computer processors, to identified persons based on whether the person is a creator of a stored record, a commentator on a stored record or a team member.

3. The method of claim 1 wherein selecting, using the one or more computer processors, the preferred subset of stored records and determining the list of recommended contacts is performed in a background of an application being used by a user to input the description of the product design.

4. The method of claim 1 further comprising:
    determining, using the one or more computer processors, contact information for the list of recommended contacts; and
    allowing, using the one or more computer processors, a user to contact a recommended contact using the contact information.

5. The method of claim 1 further comprising providing presence information, using the one or more computer processors, for the list of recommended contacts indicating whether recommended contacts are available to be contacted.

6. The method of claim 1 wherein outputting comprises displaying, using the one or more computer processors, the at least one record of the subset of stored records and the list of recommended contacts on an interface.

7. The method of claim 1 further comprising receiving, using the one or more computer processors, configuration information for a company, the configuration information used to determine the subset of stored records.

8. The method of claim 7 wherein the configuration information customizes a scoring methodology for the company.

9. The method of claim 1 wherein comparing, using the one or more computer processors, comprises comparing the determined terms to stored terms determined from the plurality of stored records.

10. The method of claim 1, wherein selecting, using the one or more computer processors, the subset of stored records comprises:
   determining one or more stored terms for each stored record that matches the determined terms;
   determining weights for the matched one or more stored terms;
   calculating a score for each stored record based on the weights for the matched one or more stored terms;
   ranking the stored records based on the calculated scores; and
   selecting the subset of stored records based on the ranking of the stored records.

11. The method of claim 1, wherein determining, using the one or more computer processors, the list of recommended contacts comprises:
   determining a list of persons associated with each stored record in the preferred subset of stored records;
   calculating a score for the list of persons based on each person's association with a stored record;
   ranking persons found in the list of persons for each stored record based on the calculated scores; and
   determining, using the data processor, the list of recommended contacts from the ranking of persons.

12. The method of claim 1 wherein the at least one record in the preferred subset of stored records or the list of recommended contacts is outputted by the one or more computer processors when one or more criteria for outputting the stored record or list of recommended contacts is met.

13. A computer-readable storage medium comprising encoded logic for execution by one or more computer processors, the logic when executed executable to:
   receive a description for a product design;
   analyze the description to determine one or more terms describing the product design;
   compare the determined one or more terms to a plurality of stored records;
   select a subset of stored records based on the comparison, the subset of stored records considered relevant to the description of the product design;
   assign weights to terms included in each of the subset of stored records based on relevancy criteria;
   calculate a score for each record in the subset of stored records utilizing the weights assigned to the terms in each record;
   select a preferred subset of stored records based on scores assigned to each record in the subset of stored records;
   analyze each record in the preferred subset of stored records to identify persons associated with each record;
   apply relevancy criteria to identified persons to determine a list of recommended contacts associated with the preferred subset of stored records, the list of recommended contacts considered to have potential knowledge relevant to the description of the product design; and
   output at least one of the records in the preferred subset of stored records and the list of recommended contacts.

14. The computer-readable storage medium of claim 13 where applying relevancy criteria to identified persons further comprises:
   assigning weights, using the one or more computer processors, to identified persons based on whether the person is a creator of a stored record, a commentator on a stored record or a team member.

15. The computer-readable storage medium of claim 13 wherein logic executable by one or more computer processors to select the preferred subset of stored records and determine the list of recommended contacts is executed in a background of an application being used by a user to input the description of the product design.

16. The computer-readable storage medium of claim 13, wherein the logic when executed by one or more computer processors is further executable to:
   determine contact information for the list of recommended contacts; and
   allow a user to contact a recommended contact using the contact information.

17. The computer-readable storage medium of claim 13, wherein the logic when executed by one or more computer processors is further executable to receive configuration information for a company, the configuration information used to determine the subset of stored records.

18. The computer-readable storage medium of claim 13 wherein logic executable by one or more computer processors to determine the subset of stored records comprises logic executable to:
   determine one or more stored terms for each stored record that match the determined terms;
   determine weights for the matched one or more stored terms;
   calculate a score for each stored record based on the weights for the matched one or more stored terms;
   rank the stored records based on the calculated scores; and
   determine the subset of stored records based on the ranking of the stored records.

19. The computer-readable storage medium of claim 13, wherein logic executable by one or more computer processors to determine the list of recommended contacts comprises logic executable to:
   determine a list of persons associated with each stored record in the subset of stored records;
   calculate a score for the list of persons based on each person's association with a stored record;
   rank persons found in the list of persons for each stored record based on the calculated scores; and
   determine the list of recommended contacts from the rank of persons.

20. An apparatus comprising:
   one or more computer processors; and
   logic encoded in one or more computer readable-storage media for execution by the one or more computer processors and when executed executable to:
   receive a description for a product design;
   analyze the description to determine one or more terms describing the product design;
   compare the determined one or more terms to a plurality of stored records;

select a subset of stored records based on the comparison, the subset of stored records considered relevant to the description of the product design;

assign weights to terms included in each record of the subset of stored records based on relevancy criteria;

calculate a score for each record in the subset of stored records utilizing the weights assigned to the terms in each record;

select a preferred subset of stored records based on scores assigned to each record in the subset of stored records;

analyze each record in the preferred subset of stored records to identify persons associated with each record;

apply relevancy criteria to identified persons to determine a list of recommended contacts associated with the preferred subset of stored records, the list of recommended contacts considered to have potential knowledge relevant to the description of the product design; and output at least one of the records in the preferred subset of stored records and the list of recommended contacts.

* * * * *

UNITED STATES PATENT AND TRADEMARK OFFICE
CERTIFICATE OF CORRECTION

PATENT NO.         : 8,321,458 B2  
APPLICATION NO.    : 12/579467  
DATED              : November 27, 2012  
INVENTOR(S)        : Batra et al.

Page 1 of 1

It is certified that error appears in the above-identified patent and that said Letters Patent is hereby corrected as shown below:

On sheet 3 of 8, in figure 3, Reference Numeral 110, line 5, delete "Contracts" and insert -- Contacts --, therefor.

On sheet 6 of 8, in figure 6, Reference Numeral 604, line 1, delete "Retreive" and insert -- Retrieve --, therefor.

Signed and Sealed this  
Fifth Day of March, 2013

Teresa Stanek Rea  
*Acting Director of the United States Patent and Trademark Office*